United States Patent
Sosa et al.

(10) Patent No.: US 6,489,378 B1
(45) Date of Patent: Dec. 3, 2002

(54) METHOD FOR THE PREPARATION OF CORE-SHELL MORPHOLOGIES FROM POLYBUTADIENE-POLYSTYRENE GRAFT COPOLYMERS

(75) Inventors: Jose M. Sosa, Deer Park, TX (US); Lu Ann Kelly, Friendswood, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/661,611

(22) Filed: Sep. 14, 2000

Related U.S. Application Data

(62) Division of application No. 09/268,419, filed on Mar. 15, 1999, now Pat. No. 6,248,807.

(51) Int. Cl.$^7$ ............................ C08F 255/00; C08F 2/01; C08F 2/06
(52) U.S. Cl. ...................... 523/201; 525/232; 525/241; 525/242; 525/244
(58) Field of Search ................................. 525/244, 232, 525/241, 242, 902; 523/201

(56) References Cited

U.S. PATENT DOCUMENTS

| | | |
|---|---|---|
| 3,928,300 A | 12/1975 | Hagberg |
| 4,294,652 A | 10/1981 | Newman |
| 4,439,601 A | 3/1984 | McCurdy et al. |
| 4,451,612 A | 5/1984 | Wang et al. |
| 4,603,194 A | 7/1986 | Mendiratta et al. |
| 4,777,210 A | 10/1988 | Sosa et al. |
| 4,824,887 A | 4/1989 | Aycock et al. |
| 4,857,587 A | 8/1989 | Sosa et al. |
| 5,156,920 A | 10/1992 | Aycock et al. |
| 5,200,476 A | 4/1993 | Sosa et al. |
| 5,540,813 A | 7/1996 | Sosa et al. |

FOREIGN PATENT DOCUMENTS

| | | | |
|---|---|---|---|
| JP | 06228246 | * | 8/1994 |

OTHER PUBLICATIONS

Matsuda et al., CAPLUS AN 1995:216986 (1994).*

* cited by examiner

*Primary Examiner*—Jeffrey Mullis
(74) *Attorney, Agent, or Firm*—Conley, Rose & Tayon

(57) ABSTRACT

High impact polystyrene having a predominant core-shell morphology is made by polymerizing styrene in the presence of polybutadiene using toluene as a solvent. The thermoplastic polymer composition is characterized by a continuous phase of polystyrene containing dispersed graft copolymer particles having a core-shell structure with a polystyrene core occluded inside a polybutadiene shell. The styrene is desirably batch polymerized using styrene/toluene mixtures of about 70:30 by weight in the presence of from about 9 to about 15 weight percent polybutadiene while flashing off the toluene solvent.

11 Claims, No Drawings

METHOD FOR THE PREPARATION OF CORE-SHELL MORPHOLOGIES FROM POLYBUTADIENE-POLYSTYRENE GRAFT COPOLYMERS

This is a Divisional Application of application Ser. No. 09/268,419, filed Mar. 15, 1999 now U.S. Pat. No. 6,248,807.

BACKGROUND OF INVENTION

1. Field of the Invention

The present invention relates to thermoplastic compositions utilizing polymers of monovinylaromatic compounds which have been modified with rubber to increase their impact strength. More particularly the present invention relates to the production of high impact polystyrene (HIPS) predominantly containing graft copolymer particles having a core-shell structure with a polystyrene core occluded inside a polybutadiene shell. The predominant core-shell morphology of the invention is preferably achieved through the use of toluene as a solvent in the batch polymerization of styrene in the presence of polybutadiene.

2. Description of Related Art

Three terms commonly used by those of skill in the art to describe the morphologies of graft copolymer particles in HIPS are core-shell, cell and maze. The correlation between improved gloss in HIPS and the number of graft copolymer particles exhibiting a core-shell morphology is also well known. A considerable amount of grafting is required in order to produce the core-shell morphology. The conventional method for achieving a higher concentration of core-shell graft structures in HIPS is through the use of SBR (styrene-butadiene rubber) block copolymers, or SBS or BSB terpolymers, as the rubbery components. In the case of styrene-butadiene copolymers it is common to use styrene-butadiene diblock polymers that contain 60 to 80 percent polybutadiene blocks and 20 to 40 percent polystyrene blocks.

Although economics favor the use of polybutadiene instead of SBR as the rubbery component in HIPS, conventional batch polymerizations of styrene using polybutadiene in hexane or cyclohexane solvents tend to produce cell structures as the predominant morphology. Using ethylbenzene as the solvent and polybutadiene as the rubber component in the production of HIPS produces significant quantities of all three morphologies. These results are unsatisfactory where the HIPS is intended for use in applications requiring higher gloss.

U.S. Pat. No. 4,528,327 discloses thermoplastic compositions comprising a polyphenylene ether and a rubber modified polystyrene resin containing a majority of core-shell structures having a polystyrene core inside a shell of polybutadiene.

Japanese Patent 2038435 discloses a rubber-modified styrene composition wherein the rubbery polymer is present in both core-shell and cell morphologies. Disclosed core-shell structures include styrene type polymer cores within rubbery polymer shells made of natural rubber, polybutadiene rubber, polyisoprene rubber, styrene-butadiene copolymer rubber, styrene-isoprene copolymer rubber, butyl rubber, and ethylene-propylene rubber.

Japanese Patent 2057311 discloses a rubber-modified polystyrene resin for use in making injection blow molded products. The resin comprises a polystyrene continuous phase and dispersed rubber particles having a core-shell structure in which polystyrene cores are enveloped with shells of rubber films. The average particle size ranges from 0.3 to 2.0 microns, and the resin has a graft rubber content of 1–15 weight percent. The rubbers disclosed for use in the invention include polybutadiene, polybutene and polyisoprene. The rubber particles are said to give high transparency, surface gloss and strength to the molded products.

SUMMARY OF THE INVENTION

The invention disclosed herein is a rubber-modified thermoplastic composition made by polymerizing a monovinyl aromatic polymer in the presence of rubber and a solvent to produce a resin having a core-shell morphology. According to one preferred embodiment of the invention, HIPS having a predominant core-shell morphology is made by polymerizing styrene in the presence of polybutadiene using toluene as a solvent. The thermoplastic polymer composition of the invention is characterized by a continuous phase of polystyrene containing dispersed graft copolymer particles having a core-shell structure with a polystyrene core occluded inside a polybutadiene shell.

A particularly preferred HIPS of the invention is produced when the styrene is batch polymerized using styrene/toluene mixtures of about 70:30 weight percent ratios in the presence of from about 9 to about 15 weight percent polybutadiene, while flashing off the toluene solvent. The solubilized polybutadiene is preferably either high or medium cis, and the peroxide initiator level preferably ranges from about 250 to about 500 ppm. A preferred temperature profile for the polymerization is about 110° C. for about 75 minutes, followed by about 130° C. for about 60 minutes and about 150° C. for about 60 minutes.

DESCRIPTION OF THE PREFERRED EMBODIMENTS

The composition of the invention preferably comprises a rubber-modified monovinyl aromatic polymer, most preferably polystyrene. Styrene monomer is desirably polymerized in the presence of from about 9 to about 15 weight percent rubber to produce a polymer having impact resistance superior to that of crystal polystyrene. A preferred rubber for use in making the subject compositions is polybutadiene. The resultant thermoplastic composition, when made with these preferred materials, is high impact polystyrene, or HIPS. The predominant morphology of the preferred polymer of the invention is core-shell, meaning that the continuous phase of polystyrene comprises a plurality of dispersed structures in which small quantities of polystyrene are occluded inside single cell polybutadiene shells grafted to the aromatic polymer. These core-shell structures are known to contribute to the gloss of the resultant polymer, and resins having higher contents of core-shell structures exhibit more gloss that those having higher contents of structures with so-called cell or maze morphologies.

Styrene polymerization processes are well known. The compositions of the invention are preferably made by batch polymerization in the presence of from about 9 to 15, and most preferably from about 9 to about 12, weight percent polybutadiene using conventional initiators at concentrations of from about 250 to about 500 ppm and using toluene as the solvent. Preferred initiators useful in making the invention include peroxide initiators having a half-life of one-half to one hour at 110–130 C., such as ethyl-3,3-di(t-butylperoxy)butyrate; 1,1-di(t-butylperoxy)cyclohexane;

t-butyl perbenzoate; 1,1-di-(t-butylperoxy)-3,3,5-trimethyl-cyclohexane; ethyl-3,3-di(t-amylperoxy)butyrate and 1,1-di-(t-amylperoxy) cyclohexane. The use of toluene as the solvent, as compared for example to the use of either hexane or cyclohexane, appears to promote the grafting reaction between styrene and polybutadiene. Although HIPS compositions having significant core-shell morphologies are produced using mixtures comprising styrene/toluene ratios of from about 85:15 to about 70:30, polymers having the predominant core-shell morphology of the invention are produced whenever the styrene/toluene weight ratio is about 70:30.

Grafting is also favored by using polybutadiene having a medium or high-cis isomer content, with a medium-cis polybutadiene being most preferred. Polybutadiene useful in making the composition of the invention is produced, for example, by known processes by polymerizing butadiene in either a hexane or cyclohexane solvent to a concentration of about 12 weight percent, and flashing off the solvent at a temperature ranging from about 80° to 100° C. to further concentrate the polybutadiene solution to about 24 to 26 weight percent, the approximate consistency of rubber cement. The crumb polybutadiene is then precipitated from the solution using steam, then dried and baled.

In making the preferred compositions of the invention, batch polymerizations are preferably conducted in 70:30 styrene solvent mixtures while flashing off solvent. A preferred temperature profile to be followed in producing the subject compositions is about 110° C. for about 75 minutes, about 130° C. for about 60 minutes, and about 150° C. for about 60 minutes. The polymer is then dried and devolatilized by conventional means. A batch polymerization conducted in this manner using about 10.7 weight percent polybutadiene and a styrene/toluene mixture in a ratio of about 70:30 by weight produced impact polystyrene having a predominant core-shell structure with an average rubber particle size of about 0.5 microns, a span of about 2.8 microns, a gel-rubber ratio of about 2.1 and a swell index of about 11. By contrast, the production of HIPS by the same method and according to the same general formulation except using hexane or cyclohexane instead of toluene resulted in morphologies that were not predominantly core-shell. The production of HIPS by the same method and according to the same general formulation except using styrene/toluene mixtures in a ratio of about 90:10 likewise resulted in morphologies that were not predominantly core-shell.

In view of the foregoing, it is believed that HIPS polymers having predominant core-shell morphologies can be produced at a significantly lower cost than would otherwise be required (with SBR rubber) by using polybutadiene in combination with a toluene solvent, where the toluene is present in the ratio of about 30 parts by weight toluene to about 70 parts by weight styrene. Other alterations and modifications of the invention will likewise become apparent to those of ordinary skill in the art upon reading the present disclosure, and it is intended that the scope of the invention disclosed herein be limited only by the broadest interpretation of the appended claims which the inventors are legally entitled.

What is claimed is:

1. A rubber-modified thermoplastic composition having a predominate core-shell morphology made by preparing a polymerizable mixture comprising a monovinyl aromatic monomer, polybutadiene homopolymer, an initiator and toluene, batch polymerizing the mixture while flashing off toluene using a temperature profile of about 110° C. for about 75 minutes, about 130° C. for about 60 minutes, and about 150° C. for about 60 minutes; and devolatilizing the resultant polymer.

2. The composition of claim 1 wherein the monovinyl aromatic monomer is styrene.

3. The composition of claim 2 wherein the ratio of styrene to toluene prior to polymerization is about 70 to 30 by weight.

4. The composition of claim 2 comprising a continuous phase of polystyrene and a discontinuous phase of dispersed particles having a predominant core-shell morphology, such particles comprising a graft copolymer of polystyrene and polybutadiene and having a polystyrene core occluded within a polybutadiene shell.

5. The composition of claim 1 wherein the polybutadiene homopolymer is present in an amount ranging from about 9 to about 15 weight percent.

6. The composition of claim 5 wherein the polybutadiene homopolymer is present in an amount ranging from about 9 to about 12 weight percent.

7. The composition of claim 1 wherein the monovinyl aromatic monomer is batch polymerized and the toluene is flashed-off during polymerization.

8. The composition of claim 4 having a volume average rubber particle size of about 0.5 microns.

9. The composition of claim 8 having a span of about 2.8 microns.

10. The composition of claim 9 having a gel-rubber ratio of about 2.1.

11. The composition of claim 10 having a swell index of about 11.

* * * * *